United States Patent

[11] 3,603,943

[72] Inventors Paul J. Badum;
Vladimir Nejezchleb, both of Boulder, Colo.
[21] Appl. No. 790,710
[22] Filed Jan. 13, 1969
[45] Patented Sept. 7, 1971
[73] Assignee International Business Machines Corporation
Armonk, N.Y.

[54] PNEUMATIC RECORD PROCESSING SYSTEM
16 Claims, 9 Drawing Figs.

[52] U.S. Cl. 340/174.1C, 179/100.2 PM, 226/95
[51] Int. Cl. G11b 15/38
[50] Field of Search 340/174.1 C, 174.1 E; 179/100.2 P, 100.2 PM; 226/95, 97

[56] References Cited

UNITED STATES PATENTS

| | | | |
|---|---|---|---|
| 3,184,131 | 5/1965 | Fieldgate | 226/95 |
| 3,314,729 | 4/1967 | Baumeister et al. | 226/97 |
| 3,378,826 | 4/1968 | Gabor | 340/174.1 |
| 3,386,772 | 6/1968 | Plztter et al. | 226/97 |
| 3,525,087 | 8/1970 | Bukovich et al. | 340/174.1 E |

FOREIGN PATENTS

| | | | |
|---|---|---|---|
| 1,382,113 | 7/1962 | France | 226/95 |

*Primary Examiner*—Terrell W. Fears
*Assistant Examiner*—Vincent P. Canney
*Attorneys*—Hanifin and Jancin and Roger S. Smith

ABSTRACT: A magnetic storage system for processing record members permanently affixed to storage containers. The system includes a processing chamber including a drive capstan positioned between a pair of storage bins or columns. A container having an elongated flexible record member stored therein with both ends permanently affixed thereto is positioned adjacent the chamber. Means are provided for drawing the portion of the record member between the fixed ends into the chamber and over the drive capstan. This tape portion is then driven back and forth between the storage columns and past a transducer so that information can be written on and read from the member. At the termination of a processing operation, the tape is returned to the storage container and the container is removed.

INVENTORS
PAUL J. BADUM
VLADIMIR NEJEZCHLEB
BY
ATTORNEY

PNEUMATIC RECORD PROCESSING SYSTEM

SUMMARY OF THE INVENTION

The present invention relates to improvements in magnetic record storage systems, and more particularly systems which employ magnetic tape for information storage.

Traditionally, magnetic tape storage systems have utilized ½-inch wide record tapes of substantial length, stored on reels and processed for reading or writing while being fed from one storage reel to another in a tape transport. Half-inch tape reel storage systems of this sort have great storage capacity, and are used widely in information-handling systems. The information stored is not, however, available on a random access basis, since a given record can only be accessed by mounting the reel containing the record on a transport and scanning the contents during a feeding operation, until the sought-after record is located. There is a need for a tape storage system which provides the massive information storage capability of present ½-inch tape systems, but with enhanced availability of individual stored records. Such a system should provide for storage of sizable amounts of information on record members that can be scanned in their entirety in substantially less time than is now possible with conventional ½-inch tapes. It should also provide for automatic loading and unloading of the record member on the transport mechanism so that individual records on separate members can be rapidly accessed for processing. It is the principal object of this invention to provide a novel record member handling mechanism that satisfies these requirements.

More specifically, it is an object of this invention to provide a magnetic record storage system in which a flexible magnetic storage record member can be rapidly presented in operative position, processed throughout its entire useful length, and restored to its stored condition in minimum time.

It is also an object of this invention to provide means for handling a record member in the manner just described without the intervention of a human operator.

A further object of the invention is to provide record member handling means of the type described in which the necessity for reeling and unreeling the member during processing is avoided.

These and other objects of the invention are achieved by the provision of a novel record member handling system in which individual record members are contained within storage containers or cartridges that are bodily presented for processing to a processing station or apparatus. The processing apparatus is adapted to extract the entire useful length of the record member from the storage container while leaving the member connected to the container, and loop the extracted portion over a drive capstan and into a pair of storage columns or chambers. By rotating the capstan, the extracted portion of the record member can be transferred from one storage column to the other at any desired speed. A transducer is provided in the apparatus in position to be traversed by the member as it is driven between the storage columns, so that information can be written upon or read from the member along substantially the entire length thereof during each traversal. Means are also provided to rapidly restore the member to its container when processing is completed, so that it can be removed and another like member can be processed.

The handling system provided in accordance with this invention offers the advantages of rapid mechanical handling, including loading and unloading without human handling, and is therefore capable of operating with a mechanized container handling system that can make massive storage files available for processing under computer control. It also has the capability of processing the record member without the need for expensive and complex reel control mechanisms, and the ability to process data during both directions of translation of the tape section, so that maximum advantage can be taken of the record member with relatively simple and economical handling equipment.

The foregoing and other objects, features, and advantages of the invention will be apparent from the following more particular description of the preferred embodiments of the invention, as illustrated in the accompanying drawings.

Figure 5:
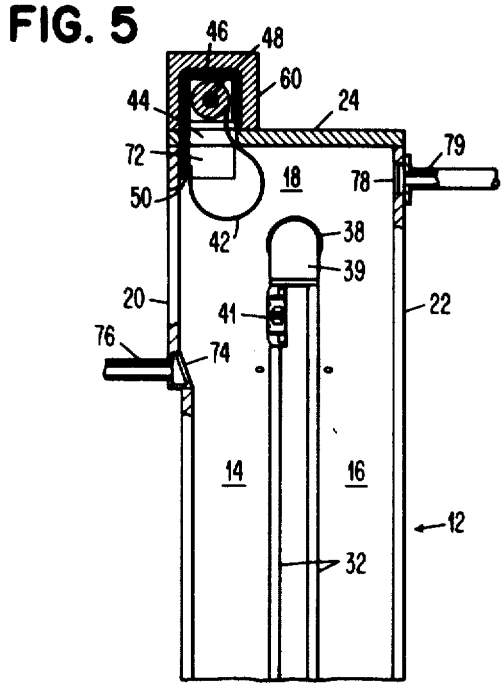
Figure 6:
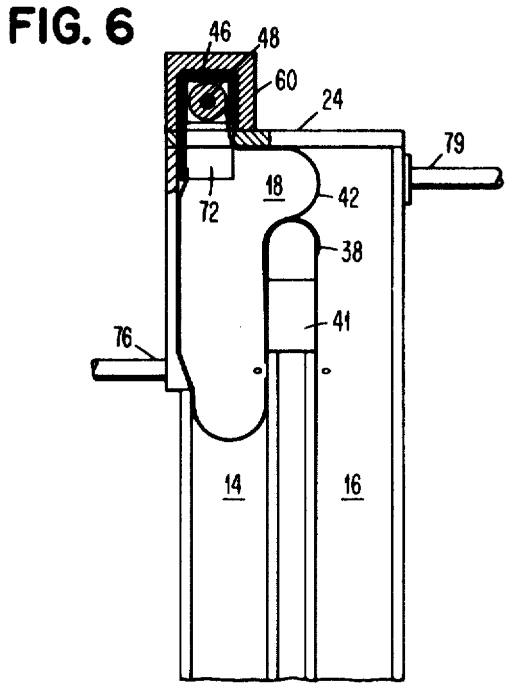
Figure 7:
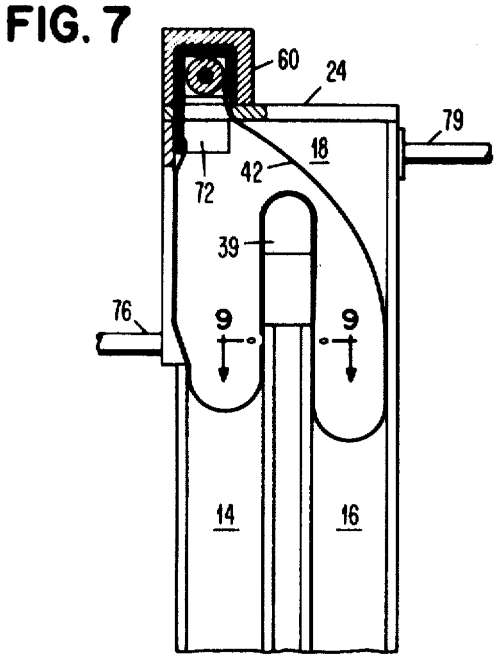
Figure 8:
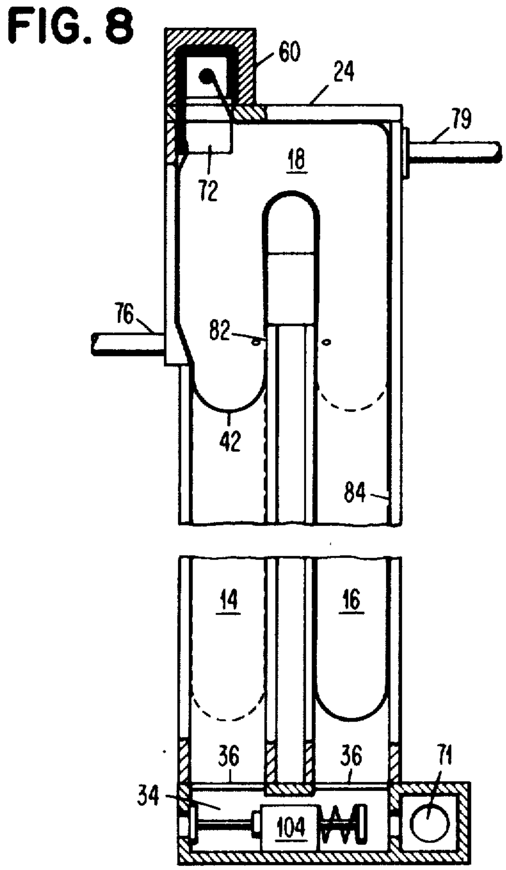
Figure 9:
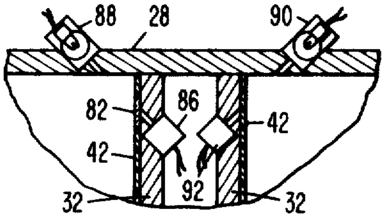

FIGS. 5, 6, 7, and 8 are elevational views of the record-processing apparatus of this invention showing insertion of the tape into the processing chamber; and FIG. 9 is a partial sectional view taken along the lines 9—9 of FIGURE 7.

DETAILED DESCRIPTION

General

Figure 1:
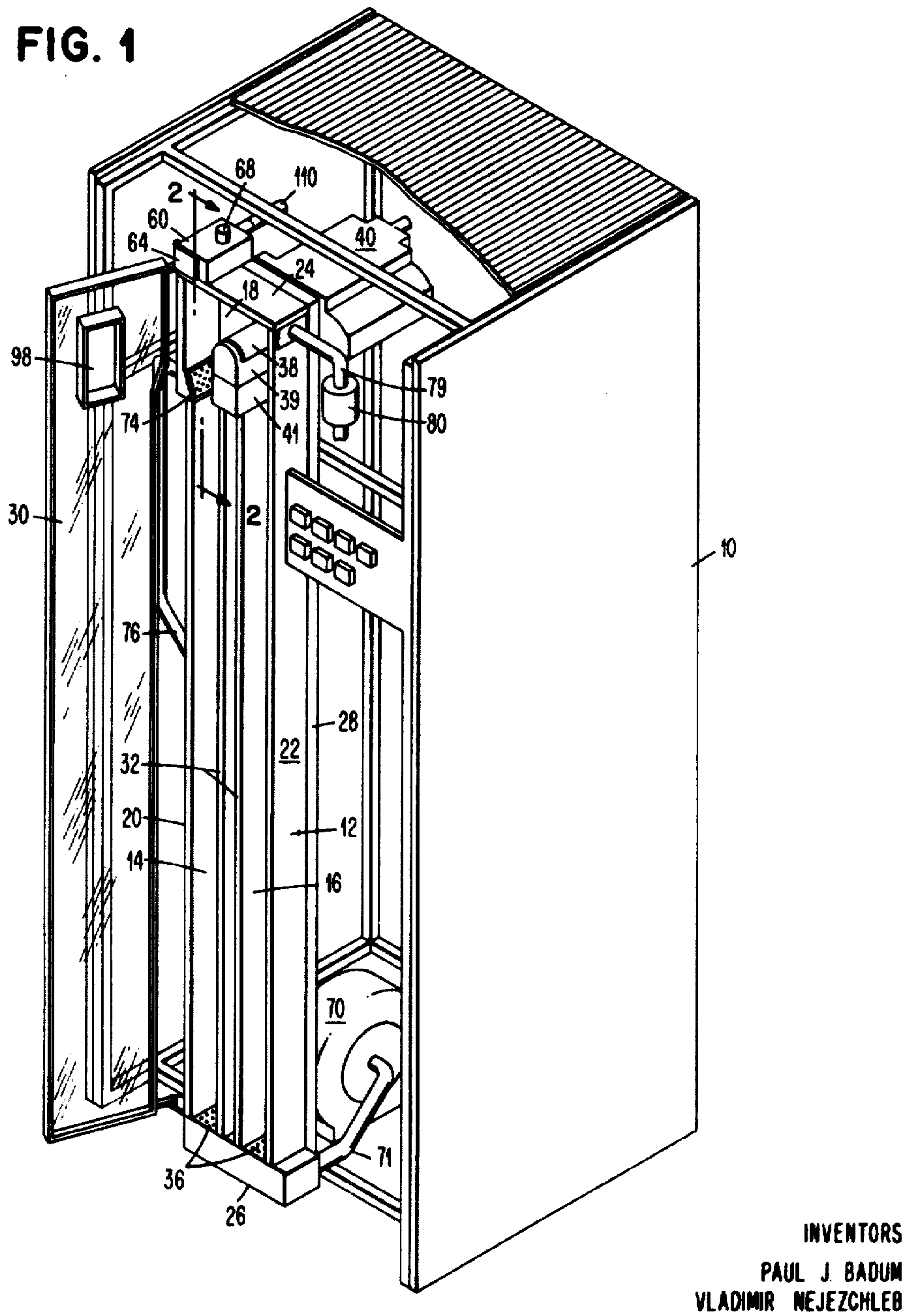
FIG. 1 is a perspective illustration of a record processing apparatus provided in accordance with the invention.

A general understanding of the present invention and its operation will be attained by reference to FIG. 1 of the drawings which shows a perspective view of a magnetic storage apparatus embodying the invention. As stated earlier herein, this invention is directed toward a high availability information storage system, with large volume storage capacity. The invention employs conventional magnetic recording concepts that are well understood in the art and of proven value. The recording media is conventional, consisting of a flexible web having a magnetizable recording surface. Information is stored on and read from the tape by passing it over a transducer including having generally conventional magnetic heads that read and write magnetic patterns on the tape. The invention departs from the prior art in the manner in which the record media is handled for processing and in the physical configuration of the media.

It will be appreciated that, although the invention is described with respect to a system for writing and reading information magnetically stored on a record member having a magnetic storage surface, other forms of storage and readout can be accommodated. Such forms might include optical storage, surface deformation storage, or other known techniques. The transducing means would, of course, take whatever form necessary to accomplish storage and readout for the particular technique employed.

As shown in FIG. 1, the processing apparatus provided in accordance with this invention consists of a housing unit, generally indicated by the reference numeral 10, which supports a processing chamber 12. The chamber 12 is in the form of an inverted U, having two separate vertical columnar portions 14 and 16 which communicate at the top with a plenum area 18. The several portions 14, 16, and 18 are enclosed by walls including sidewalls 20 and 22, top and bottom walls 24 and 26, a rear wall 28, and a front wall 30. The front wall 30 is in the form of a door which may be opened to provide access to the processing chamber. The two columnar chamber portions 14 and 16 are divided by a partition arrangement indicated at 32. This portion terminates short of the bottom wall 26 to provide a vacuum plenum 34 common to both columns 14 and 16 (See FIG. 8). A screen or apertured plate 36 separates the plenum 34 from the two columns. During operation of the device, a partial vacuum may be maintained in the plenum 34 for a purpose which will become apparent later herein.

At the upper end of the partition 32, a drive capstan 38 is positioned. The capstan 38 is cylindrical in shape and extends substantially the full depth of the chamber 12 from the front wall 30 to the rear wall 28. The capstan 38 is mounted on a framework 39 that rests on the top of the partition 32. This framework extends through the rear wall 28 of the housing and also carries a motor 40 that drives the capstan. The capstan diameter is at least equal to and preferably slightly greater than the distance between the two columns 14 and 16. Below the capstan, a transducer assembly 41 is mounted in the partition 32 so that its operating surface is exposed to the column portion 14. The operating surface of the transducer 41 is preferably positioned substantially flush with the sidewall surface of the column 14, though it may protrude into the column somewhat, depending upon the transducer's construction. A satisfactory nonprotruding transducer is disclosed in U.S. Pat. No. 3,327,916, issued June 27, 1967, to J. A. Weidenhammer et al., and assigned to the assignee hereof.

Figure 3:
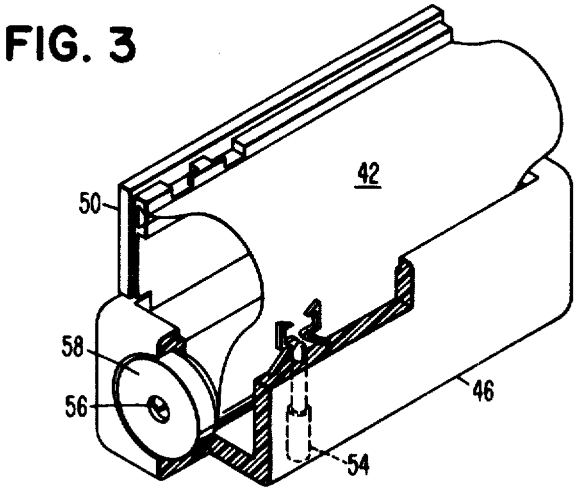
FIG. 3 is a perspective view, partially in section, of a record storage container employed with this invention.

The processing chamber just described is adapted to receive a record tape 42 (see FIG. 3). The top wall 24 has therein an opening 44, preferably located at the left end, through which the tape may be admitted to the chamber. The tape itself is contained in a cartridge or container 46 that may be bodily moved into operative position over the opening 44 to present a tape for processing. While the exact configuration of the container 46 and the manner in which it is translated to and from the operative position may vary, it is a feature of this invention that both ends of the tape be fixed to the container and that the portion intermediate the ends be removable through the opening 44 to loop down into the processing chamber. Several different container configurations can be envisioned; a particularly effective arrangement comprises a boxlike element having a single reel 48 journaled therein upon which a length of tape is wound. One sidewall 50 of the container is hinged and forms an openable cover. The outer end of the tape is secured to the cover 50, while the other end is permanently affixed to the reel 48. When the container is placed in operative position over the opening 44, the cover 50 is opened and the tape is lowered into the chamber 18. Sufficient tape is provided on the reel 48 to loop over the capstan 38 and at least partially into each column 14 and 16. Once the tape is fully stripped from the reel 48, the portion extending into the processing chamber from the end attached to the reel is pulled up into the upper right-hand corner of the plenum 18 and held clear of the capstan. The tape progresses from this point down into the column 16 to form one loop and, thence, over the capstan, past the transducer 41, into the column 14 to form a second loop, and up the left side of the plenum 18 to the cover 50 where the other end is secured.

The tape 42 is processed within the chamber by operating the capstan 38 to translate the tape between the columns 14 and 16 so that the effective storage portion passes the transducer 41. Somewhat less than the entire length of the tape can be effectively passed in transducing relation with transducer 41, but, as will be apparent from examination of FIG. 8 of the drawings, which shows the extreme processing positions, one in solid lines and the other in dashed lines, only a short portion at each end of the tape is not available for magnetic storage.

With the general understanding of the invention in mind, attention will now be directed toward a more complete description of the several operating features and functions.

The tape storage container

Figure 4:
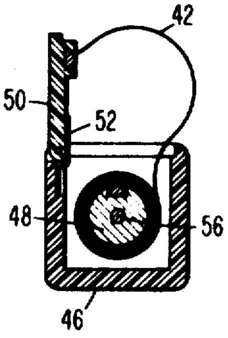
FIG. 4 is a sectional view of the container of FIG. 3.

FIGS. 3 and 4 of the drawings illustrate the tape storage container 46 employed with this invention. As earlier mentioned, the particular configuration of the container is not a part of the present invention, it being contemplated that any container capable of holding a substantial length of tape 42 with opposite ends secured to the container will suffice. The container 46 is disclosed and claimed in the application Ser. No. 697,853, by P. J. Badum and H. Zeiger, filed on even date herewith and assigned to the assignee hereof now U.S. Pat. No. 3,571,685. This container 46 is essentially a rectangular box of plastic or other lightweight material having a cover 50 as one sidewall. The cover 50 is hinged at one edge so that it may swing out at least 90° to provide an unrestricted opening to the interior. A cover spring 52 yieldingly urges the cover 50 into open position. Latch means operated by a pushbutton 54 retains the cover in closed position. When the button 54 is depressed, the cover is released and allowed to spring open under influence of its spring 52.

Within the container, reel or record member support 48 is journaled for free rotation. The reel is fixed to a shaft 56 that extends through one end wall of the container and has a clutch disk 58 fixed thereto outside the container. The clutch disk 58 is used to rewind the tape 42 into the container after processing, as will be explained in detail later.

Loading the tape

Figure 2:
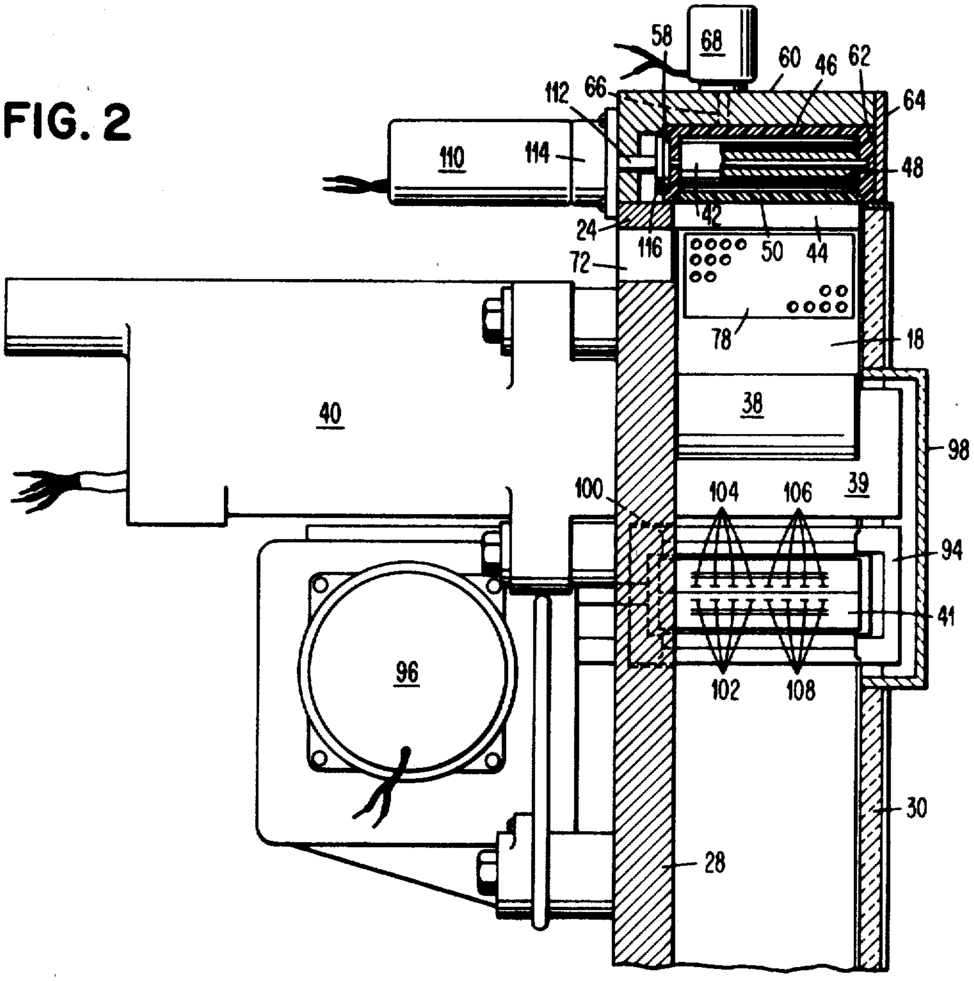
FIG. 2 is an enlarged partial vertical sectional view taken substantially along the lines 2—2 of FIG. 1.

As previously described, the tape 42 is loaded for processing by positioning the container 46 over opening 44 and drawing the tape into the processing chamber. Depending upon the method of handling containers, any of several mechanisms may be provided adjacent the opening 44 to position the container 46. The apparatus for presenting, removing, and storing containers is not a part of this invention and is not shown. FIGS. 2 and 5 show a cagelike framework 60 mounted above the opening 44 for supporting a container in operative position. The framework 60 has an opening 62 at the front, through which the cartridge may be inserted and a hinged closure plate 64 that is used to secure the cartridge against movement when it is in place. The cartridge is inserted into framework 60 with its cover 50 facing downward over the opening 44. Cover unlatching means, including a plunger 66 and an operating solenoid 68 therefor, are mounted on the framework 60. Upon energization of the solenoid 68, plunger 66 is driven downwardly through an opening in the upper wall of framework 60 to operate pushbutton 54 of the container latching means and unlatch the cover 50. Under influence of its spring 52, the cover swings rapidly down through opening 44 to its open position and comes to rest against sidewall 20 of the processing chamber. As earlier described, one end of the tape 42 is secured to the cover and the reel 48 in the container is journaled for free rotation. Consequently, the opening movement of the cover pulls a small amount of tape from the reel into the chamber. The inertia of the reel will cause it to continue rotation briefly after the cover movement has ceased and will feed additional tape into the chamber to produce a small loop, as shown in FIG. 5.

At about the same time that the cover is opened, vacuum is applied to the plenum 34 from the vacuum pump 70 connected to the plenum by conduit 71, to reduce the pressure within the columns and the area 18. Since, as shown in FIG. 2, the width of the tape 42 is essentially equal to that of the interior portions of the chamber, the tape will effectively seal the chamber from the opening 44 and a pressure differential will be created that will force the loop of tape down into the processing chamber, continuing rotation of reel 48 and withdrawing the tape therefrom. To insure this action, an additional opening 72 is formed in the rear wall 28 adjacent the opening 44 to maintain atmospheric pressure above the tape loop.

FIGS. 6 and 7 illustrate the progress of the loading operation under influence of the vacuum in plenum 34. It has been found in actual practice that since the expansion of the loop of tape 42 is produced by feeding more tape from the reel to the right-hand side of the loop, as viewed in FIGS. 5–8, the tendency is for the tape to enter column 16 more readily than column 14. Accordingly, column 14 may be widened slightly near the upper end to insure that a partial loop of tape is formed in that column, as well as in column 16. As shown, this widening occurs from a point just below the level of transducer 41 upwardly. Column 14 is thus made wider than column 16 and, since the force acting to draw the tape into the two columns is proportional to the cross-sectional areas of the columns, greater force is asserted in column 14 than in column 16 until the tape loop fills the widened area, as shown in FIG. 6. Once the position of FIG. 6 is reached, the tape will tend to dump into column 16 (see FIG. 7), since very little frictional force is present in this column due to the feeding of the tape web from the right side. A vacuum port 74, positioned in sidewall 20 at the point of widening, clamps the flight of tape leading from the cover 50 firmly to wall 20 and holds it in place during subsequent operations. Port 74 is coupled via conduit 76 to the vacuum plenum 34 so that vacuum pressure is available at port 74 at all times during the loading operation.

Once the tape 42 has been inserted as just described, the portion thereof extending from the empty reel into the chamber 18 is pinned firmly to the upper right corner of the chamber. This is accomplished by applying vacuum to a port 78 located at the top of sidewall 22. The vacuum at this port 78 draws the tape into the corner and holds it firmly in place throughout subsequent processing. The vacuum is applied via conduit 79 from a valve 80 (FIG. 1) connected to the common vacuum source for the device. Valve 80 is preferably operated in timed sequence after opening of the container, or it may be operated in response to a sensor (not shown) which indicates the entire length of tape has been stripped from reel 48.

Processing the tape

When the tape 42 has been loaded and secured as just described, it may be processed by passing it over the transducer 41. This is accomplished by transferring the portion of tape initially stored in column 16 back and forth between the two columns. Driving force is, of course, transmitted from capstan 38.

The driving engagement between capstan 38 and the tape 42 is a simple frictional contact, although more sophisticated means, including a vacuum capstan, may be employed. Because of the large angle of wrap and the loading created by the vacuum in columns 14 and 16, good frictional engagement is achieved.

During translation of the tape between the columns, vacuum pressure in each could fluctuate because of the change in loop length in the column. Though this would not be a serious problem, it is avoided in the embodiment disclosed herein by employing a common plenum 34 communicating with both columns. The common plenum insures equalization of pressure at all times, and allows an exchange between columns as the loop lengths vary.

It will be appreciated that somewhat less than the whole length of tape 42 can be guided in transducing relation past the transducer 41. To maintain control of the tape during processing, it is necessary to maintain a wrap about capstan 38, so the transfer of tape from column 16 to column 14 must terminate while a short loop of tape remains in column 16. Similarly, transfer of tape from column 14 to column 16 must terminate while a loop remains in column 14 and before the loop has moved above the transducer 41. FIG. 8 shows the extreme position to which tape is driven into column 14 (dashed lines), and the extreme position to which it is driven into column 16 (full lines). The limits for movement of the tape are established by markers 82 and 84, applied to the tape. In the preferred embodiment, these markers are in the form of small transparent areas near the rear edge of the tape. An end-of-tape sensor, consisting of photocell 86 and a light source 88, is provided in column 14 just below the transducer 41 to detect the presence of marker 82 when the loop in column 14 has risen to the maximum allowable height, and stop further transfer of tape into chamber 16. As shown in FIG. 9, the photocell 86 is mounted in rear wall 28 and the light source is mounted in partition 32 so that it directs light toward the photocell through the rear edge of the tape 42. When the transparent marker 82 passes the sensor position, light is transmitted through it to illuminate the photocell 86 and produce an output. A similar light source 90 and photocell 92 are positioned in column 16 a short distance below the top of the column to detect marker 84 when the loop in column 16 rises to its maximum allowable position.

The signals from photocells 86 and 92 are supplied to the control circuitry (not shown) for the driving motor 40 coupled to capstan 38. In accordance with known technology, the capstan may be driven by direct connection to a reversible motor or through intermediate clutching and braking means. Its motion control apparatus, whatever form it takes, will be responsive to the signals from the two photocells to stop the tape, or stop and reverse, depending upon commands from the utilization device under whose control the tape 42 is being processed. The present invention is not concerned with the details of this processing activity and they will not be described herein. Techniques of controlling tape transports for efficient processing of information are well developed and well within the skill of the art.

The particulars of information formatting on the tape 42, bit and track densities, etc., are also matters not addressed in detail herein, since they do not form an essential part of the invention. It is important to note, however, that with the arrangement provided by this invention, tape widths substantially greater than those employed on conventional transports may be employed so that substantial amounts of information may be recorded on the tape sections stored in the container 46. In a typical application, wherein a width of 2.7 inches is selected for the tape 42, information is stored in 128 parallel tracks on the tape. Since it is difficult to obtain a multitrack transducer having the required track density to handle such closely spaced tracks, the transducer 41 is arranged to have, for example, eight tracks and means are provided to move it laterally to sixteen discrete positions to access the full number of tracks on the tape 42. The moving means, shown generally in FIG. 2, consists of a guide 94 mounted in partition 32 and supporting the transducer 41 for lateral motion. An incrementing device 96, mounted behind the rear wall 28, is attached to the transducer 41 to move it to the required positions. The device 96 may be any known incrementer; a satisfactory device is a voice coil actuator of the sort known in the art. To provide the necessary freedom of movement for the transducer 41, the front wall 30 of the unit is boxed outwardly as shown at 98 and the rear wall is recessed as shown at 100.

It has been found that the recording and playback access times for the storage device of this invention can be materially reduced if both directions of tape motion are employed for data processing, rather than identifying one direction as a "rewind" direction. Accordingly, some of the tracks on the tape 42 (preferably half of them) are recorded and read while the tape is moving from column 14 to column 16, and the remainder are recorded and readout during motion in the opposite direction. To facilitate this operation, four of the tracks of the transducer are arranged with their write gaps 102 below their read-verify gaps 104, while the other four are arranged with their write gaps 106 above their read-verify gaps 108.

Unloading the tape

When the tape 42 has been processed and is ready for removal from the processing unit, it is simply rerolled onto the reel 48 in container 46 and the container is removed. Prior to rerolling, the vacuum pump which supplies vacuum pressure to plenum 34 and ports 74 and 78 is shutdown or valved off from these elements and atmospheric pressure is admitted to plenum 34 and ports 74 and 78 to relieve the pressure differential across the tape loops. This may be accomplished by operating valve 80 to open the conduit 79 to the atmosphere and by operating valve 109 (FIG. 8) to admit air into plenum 34. The capstan 38 is also stopped at this time, of course. A rewind motor 110, mounted at the top of the processing chamber adjacent the cage 60 (see FIG. 2), is employed to perform the rewind operation. The motor 110 includes reel engaging means that is capable of moving axially of the reel 48 to drivingly engage it and rotate it in a direction to rewind the tape 42. While several arrangements for performing this engagement can be visualized, the arrangement shown includes an axially extendable shaft 112 driven by the motor 110 and actuated in the axial direction by a solenoid 114. A clutch disk 116 on the shaft 112 frictionally engages the clutch member 58 connected to the shaft of reel 48.

It will be appreciated that since one end of the tape is coupled to the cover 50, completion of the rewind operation will pull the cover 50 into its closed position. Once the cover is closed, the motor 110 may be deactivated and the container removed, by hand or mechanically.

The unloading means just described is, of course, tailored to the specific form of container shown in the drawings. If a container not using a reel to store the tape is employed, another unloading mechanism may be used. An alternative mechanism might include means for evacuating the container to draw the tape back into it, for example. In this case, the container could be a simple envelope or bin large enough to accommodate the tape.

SUMMARY

It will be understood from the foregoing that the present invention provides an extremely effective tape handling and processing means. Since the tape 42 is always secured to the container, and loaded, processed and rewound by mechanical means, very rapid handling may be achieved. In a typical case, loading and unloading can be achieved in times of about 250 milliseconds each. No handling of the tape is required, and it is not necessary to open the container outside of the processing chamber, so the possibility of contamination and damage to the tape is minimized. It is relatively simple to maintain a dirt- and dust-free environment within the chamber, so foreign matter may be readily excluded from the tape during processing. If automatic handling means are provided for presenting containers to the processing station and removing them therefrom, great volumes of information may be handled in very short time periods. Such handling means are known in the art and may be readily arranged to satisfy the handling requirements of the present invention, since simple linear movements are all that is required to insert and remove containers at the cage 60.

Although the length of tape in the container is limited to permit bodily insertion into the processing chamber, the total usable storage surface area is large, since substantial tape widths may be provided. For example, in a typical embodiment, tape having a length of 130 inches and a width of 2.7 inches is employed. Because of the unique arrangement of this invention, a full 100 inches of the tape is available for storage. With 128 tracks and a storage density of 5000 bits/inch in each track, 64 million bits of information (8 million bytes) can be stored in a single container 46. If the tape 42 is shuttled between the columns 14 and 16 at a speed of 200 inches/second, with four tracks being processed during each translation of the tape, a data storage or recovery rate of 4 million bits/second (0.5 million bytes/second) is attainable.

The preferred embodiment described hereinbefore employs vacuum as both a loading tool and a means to maintain driving engagement between the tape 42 and capstan 38. It should be understood that if sufficient driving engagement is obtained through other means, such as a vacuum capstan or a pinch roller that can be moved into the chamber 18 after the tape is loaded, it is not necessary that vacuum pressure be maintained in the columns during the processing operation. Use of vacuum during loading is still preferred, however, to insure that loops of tape are developed in both columns, though other loading techniques that don't require vacuum can be visualized and should be considered within the spirit of this invention. Such techniques might include, for example, means for driving the capstan 38 in either or both directions during a loading operation to guide the tape 42 into the two columns.

It will also be appreciated that the particular location and construction of the transducer 41 may be varied without departing from the spirit of this invention. Any position within the processing chamber that permits the tape 42 to be translated past the transducer in proper transducing relation is satisfactory. For example, instead of locating the transducer in the partition 32 as shown in the drawings, it may be mounted for insertion into the chamber inside the tape loop so that the tape passes between it and a wall of the chamber. While this would require the provision of means for withdrawing the transducer during loading and unloading operations, it would permit the tape to be loaded with its recording surface on the inside of the loop so that only the backing or substrate would engage the chamber walls and the capstan.

While the invention has been particularly shown and described with reference to preferred embodiments thereof, it will be understood by those skilled in the art that various changes in form and details may be made therein without departing from the spirit and scope of the invention.

What is claimed is:

1. An improved storage system comprising:
   a. a record storage member processing apparatus including a record member storage area;
   b. record member drive means associated with said storage area;
   c. a generally rectangular walled record member storage container having an elongated flexible record member and a record member support member movably contained therein, said record member being secured to the storage container along one wall and to said support member respectively at two spaced apart points along the length of the record member with a storage portion intermediate said points capable of being withdrawn from the container;
   d. means for supporting said container adjacent said processing apparatus;
   e. means for withdrawing said intermediate storage portion of the record member from the container including moving said support member and disposing said storage portion in the processing apparatus in driving contact with the drive means;
   f. information transducing means in said processing area;
   g. means for operating the drive means to translate said intermediate portion past said transducing means to transfer information to and from the record member; and
   h. means for withdrawing the intermediate portion of said record member from said processing apparatus back into the storage container upon completion of processing.

2. The apparatus of claim 1 wherein the record member storage area includes a pair of storage chambers and the record member drive means is positioned adjacent the chambers to translate a record member from one chamber to the other.

3. The apparatus of claim 2 wherein the two chambers communicate with a common plenum area, and the means for supporting the container is positioned adjacent the plenum area so that the record member can be withdrawn from the container into the plenum area and thence into said chambers.

4. The apparatus of claim 3 wherein two storage chambers and the plenum area form a common enclosure in the shape of an inverted "U" with the storage chambers comprising the legs of the "U," and wherein the means for supporting the container is positioned at the top of the enclosure, said apparatus further including an opening in the enclosure adjacent the container supporting means through which the intermediate portion of the record member is introduced into the enclosure for processing.

5. The apparatus of claim 4 including means for creating a pressure differential between the record member storage container and at least one storage chamber to draw the intermediate portion of the record member from the container into the common enclosure for processing.

6. The apparatus of claim 5 wherein the means for creating a pressure differential comprises means for producing a partial vacuum in at least one storage chamber.

7. The apparatus of claim 6 wherein the drive means comprises a capstan rotatably mounted between the two storage chambers and wherein the means for producing a partial vacuum includes vacuum plenum means communicating with each storage chamber at the end thereof remote from the plenum area to draw the intermediate portion of the record member partially into each chamber and loop a portion thereof over the capstan in driving engagement therewith.

8. An improved magnetic record storage and readout system comprising:
   a. a magnetic record storage member processing apparatus having an enclosed processing area including:
      i. first and second vertical storage columns in adjacent side-by-side relation,
      ii. a common plenum area communicating with the storage columns at their upper ends, said plenum area being formed by vertical extensions of the nonadjacent walls of said columns and a top wall joining said extensions, iii. drive means in said common plenum area between said storage columns, iiii. transducer means in said processing area;

b. a record member storage container having an elongated flexible record member contained therein, said record member being secured to the storage container at two spaced apart points along its length and having a storage portion intermediate said points capable of being withdrawn from said container;

c. an opening formed in the top wall of the processing area immediately adjacent the vertical extension of the wall of the first storage column through which said record member may be introduced into the processing area;

d. means for supporting said storage container over the opening in position to have the intermediate portion of the record member introduced into the processing area through said opening;

e. means operative when the container is positioned over the opening to draw the portion of the record member intermediate its secured points at least partially into each of the storage columns, said member extending from the container down the vertical extension of the wall of the first column and forming a first loop in the first column, then out of the first column, over the drive means between the columns and into the second column forming a second loop therein, and thence from said second loop back to the container;

f. means for supporting the portion of the record member between the second loop and the container against the vertical extension of the wall of the second storage chamber away from engagement with other portions of the record member in the processing area;

g. means for operating the drive means to translate the record member from one column to the other past said transducer means in information transducing relationship therewith to process the record member; and h. means for drawing the record member wholly into the container after completion of processing.

9. The apparatus of claim 8 wherein the means *f.*, includes a vacuum port positioned in the vertical extension of the wall of the second storage column and means for selectively applying vacuum pressure to said port to draw the record member thereagainst.

10. The apparatus of claim 8 wherein the means *e.*, includes means for producing a partial vacuum in the storage columns to draw the record member into the columns.

11. The apparatus of claim 10 wherein the means *e.*, for producing a partial vacuum in the storage columns includes a common vacuum plenum communicating jointly with the lower extremities of the first and second storage columns.

12. The apparatus defined in claim 11 including valve means associated with said vacuum plenum for selectively supplying said plenum with a partial vacuum or ambient pressure, said valve means being operable during insertion of the record member into the processing area and during processing of the record member to supply a partial vacuum to the vacuum plenum and being operable upon completion of processing to supply ambient pressure to the vacuum plenum to facilitate return of the record member to the container.

13. The method of processing a flexible elongated record member having two ends and removably contained in a record cartridge, including the steps of:

removing a record portion of said member from the cartridge by holding one end stationary during the entire step of removing the record member from the cartridge, while moving the other end in a predetermined manner to facilitate removal from the cartridge:

then causing reciprocating relative motion between transducing means and said record portion while simultaneously holding said ends in a fixed relationship to said cartridge; and then returning said record portion into said cartridge.

14. A record processing apparatus having a cartridge receiver for receiving a record member-containing cartridge, said cartridge having the record member with a record portion of lesser extent than the total length thereof affixed thereto at both ends and adapted to spill out the record member only along one side of the cartridge disposed toward one side of the apparatus as a loop with ends of the loop remaining in the cartridge, a pair of vacuum storage bins under said receiver and disposed toward said one side thereof such that one bin is under said receiver and a second bin is below but offset toward said one side from said receiver, a plenum connecting said receiver and said bins, and said receiver adapted to receive a cartridge only such that said loop is formed from said one side toward said second bin whereby record member insertion in both bins is facilitated.

15. The apparatus set forth in claim 14 wherein either of said bins can accommodate substantially all of said record portion as a single loop whereby reciprocation thereof is facilitated.

16. A record processing apparatus having a receiver for receiving an elongated record member containing cartridge, a pair of storage bins under the receiver with a capstan therebetween, transducing means in one of the bins, means for holding one end of a record member stationary while moving said record member from a cartridge in said receiver and moving the other end of said record member in a manner to facilitate removal of the record member from the cartridge, and means causing said capstan to reciprocate said record member between said bins while both the ends are stationarily held in the cartridge.